UNITED STATES PATENT OFFICE.

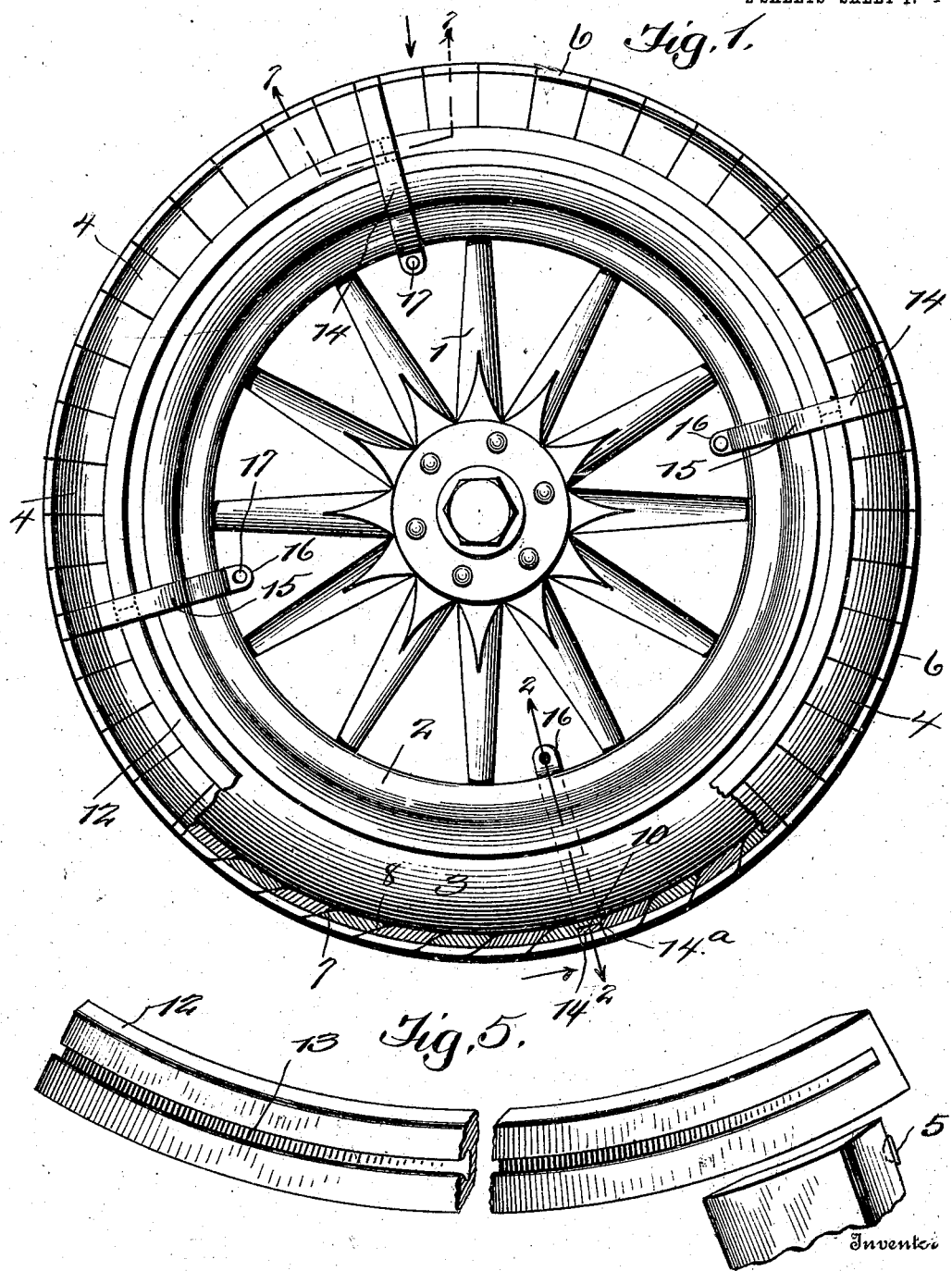

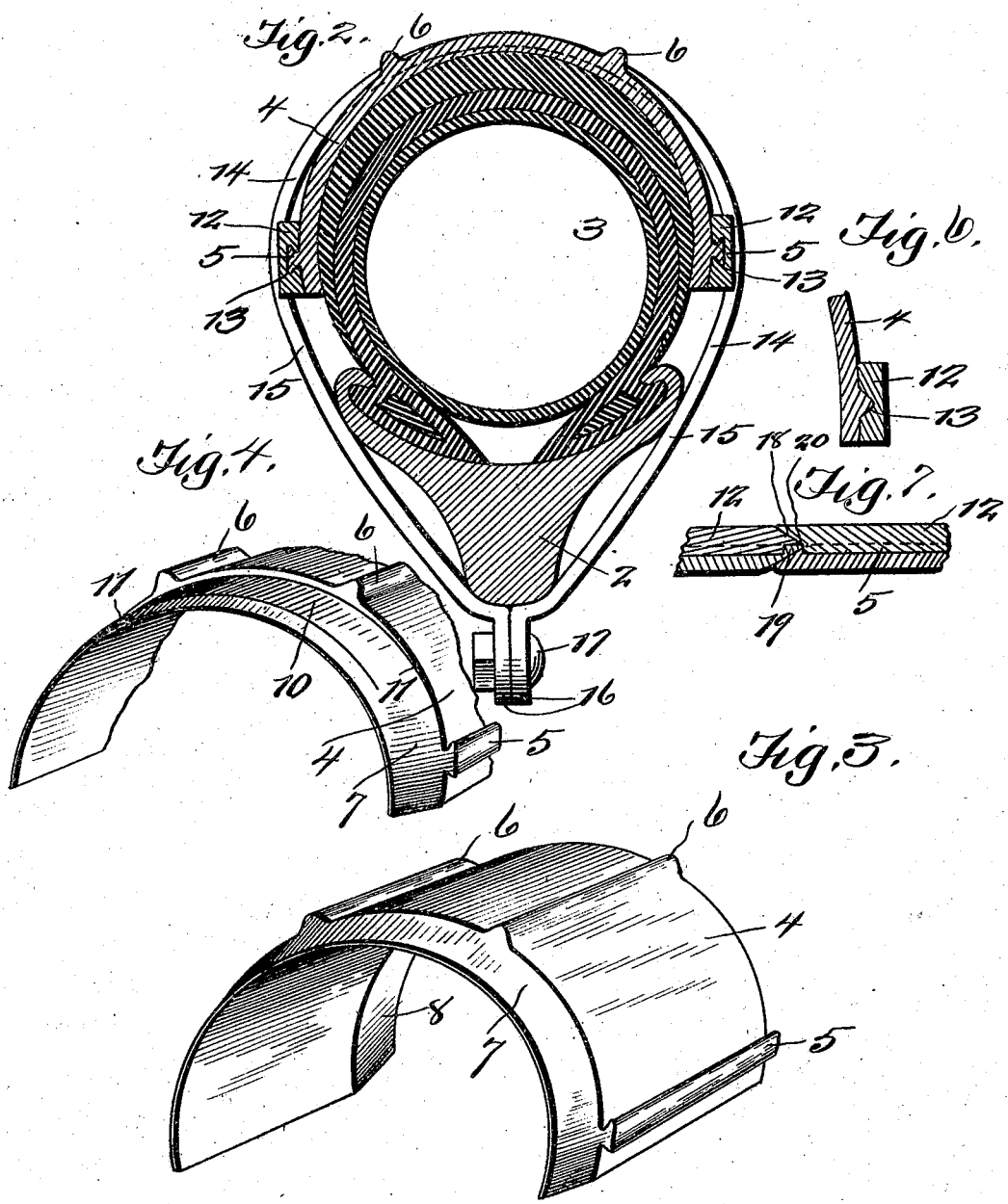

CHARLES P. MAYS, OF WASHINGTON, DISTRICT OF COLUMBIA.

ARMOR FOR TIRES.

No. 867,988.　　　Specification of Letters Patent.　　　Patented Oct. 15, 1907.

Application filed July 13, 1906. Serial No. 326,065.

*To all whom it may concern:*

Be it known that I, CHARLES P. MAYS, a citizen of the United States, residing at Washington, District of Columbia, have invented certain new and useful Improvements in Armor for Tires; and I do hereby declare the following to be a full, clear, and exact description of the invention, such as will enable others skilled in the art to which it appertains to make and use the same.
My invention relates to certain new and useful improvements in armor for vehicle tires, and the object of my invention is to provide a pneumatic tire of the ordinary type with an additional armor or protection, whereby the liability of puncture may be decreased, the wear and tear taken off the tire proper and the life of the tire increased without affecting the resiliency of the tire.

With these objects in view my invention consists in certain combinations and arrangement of parts, the preferred form of which will be first described in connection with the accompanying drawings, and then the invention particularly pointed out in the claims.

Referring to the drawings wherein the same part is designated by the same reference numeral wherever it occurs, Figure 1 is a side elevation of a vehicle wheel having a pneumatic tire and provided with my invention, a part of the armor of the tire being broken away in order to more clearly show the construction. Fig. 2 is a section taken along line 2, 2, Fig. 1. Fig. 3 is a perspective view of one of the sections of the armor. Fig. 4 is a view similar to Fig. 3, showing however only one end of a section, the form of the end of the section being slightly modified. Fig. 5 is a perspective view of one of the retaining bands for the sections, showing an end of one of the sections removed therefrom. Fig. 6 is a detailed view of a modified form of connection between the sections and the retaining bands. Fig. 7 is a detailed section on line 7 of Fig. 1.

1 designates a wheel having a rim 2 to which is secured the ordinary pneumatic tire 3. In the form of my invention shown, this pneumatic tire is of the ordinary type, comprising an inner tube, and a shoe which is secured to the rim by the ordinary clench construction.

4 are a series of protecting sections which are arranged around the periphery of the tire, as shown in Fig. 1. These sections are curved to conform to the periphery of the tire, and their ends are so cut that when they are placed on the tire, the ends coincide with the radii of the wheel, whereby the ends of the adjacent sections will abut against each other. The sections are of such a width that they do not completely surround the tire and preferably, and as shown, there is a space between their ends and the rim of the wheel. Each of these sections is provided adjacent to its side edges with a dove-
tailed shaped projection 5, and adjacent to the sides of the tread of the sections with a pair of projections 6, 6, to prevent sliding. The ends of the sections are preferably beveled, as shown in Figs. 1, 3 and 4. At one end they are beveled outwardly, as shown at 7 in Fig. 3, and at the other end are beveled inwardly or undercut, as shown at 8 in Fig. 3.

In Fig. 4 the bevel 7 is recessed, as at 10, which recess tapers, at each end thereof, as shown at 11. This recess is to receive the clamps 14, as shown at 14ª in Fig. 1, to prevent forward movement of the protecting section.

The sections are placed on the tire so that they form a solid tread with the bevel on one end of one section adjacent to the undercut portion of the next section, as is shown in the broken away portion of Fig. 1. This will cause the dovetailed projections 5 to come into register with each other and form a dovetailed projection extending all the way around each side of the armor.
12 are segmental bands provided with a dovetailed groove 13 formed in one side. The bands 12 are formed in segments of the circle, and are of such a size that the dovetailed grooves 13 may be connected to the dovetailed projections 5, so that the bands 12 will extend around the tire on each side thereof. This will effect the locking together of all the sections 4 of the armor. The groove 13 preferably, and as shown, does not extend the full length of the bands, but on one end stops just short of the end, whereby the sections will be prevented from creeping in relation to the bands.

In order to securely hold the bands 12 in place, and to prevent displacement thereof, I provide clamps 14, which consist of a pair of bars 15, having their outer ends so shaped as to come up and abut against the projection 6 of the sections, and their other ends come together inside the rim 3, the inner ends being provided with ears 16 through which a bolt 17 may be passed. In the form shown, I have used but four of these clamps. It is evident however that the number may be increased or diminished without departing from my invention. As shown in Fig. 1, the clamps 14 are so arranged as to cover the adjacent ends of the bands 12. By the use of the form of clamps shown, the armor is securely held on the tire without affecting the resiliency thereof, as the clamps are not secured to the rim, but are free to move away from the rim under the influence of pressure on the tire.

While I have described what I believe to be the preferred form of my invention, I desire to have it understood that many changes may be made in the form, construction and arrangement of parts, without departing from the spirit of my invention, so far as the changes are embraced within the scope of the appended claims.

What I claim as new and desire to secure by Letters Patent is

1. An armor for tires, consisting of a series of independent protecting sections, projections formed on the sides of said sections, segmental bands extending completely around the sides of the tire and each provided with a groove in its side for engaging the projections to hold the protecting sections in position, each of said segments being of a length to engage the projections on a plurality of the sections.

2. An armor for tires, consisting of a plurality of independent protecting sections, each section being formed with a beveled end and an undercut end whereby the sections may overlap and form a smooth tread surface, projections formed on the outer sides of said sections, segmental bands extending completely around the sides of the tire, and each provided with a groove in its side for engaging the projections to hold the protecting sections in position, each of said segments being of a length to engage the projections on a plurality of said sections.

3. An armor for tires, consisting of a series of independent protecting sections, projections formed on the sides of said sections, segmental bands each provided with a groove on one side thereof adapted to engage said projections, said segments extending around the sides of the tire to hold the protecting sections in position, each of said bands being of a length to engage the projections on a plurality of the sections, and clamps adapted to engage the segments and the protecting sections to secure the armor to a wheel.

In testimony whereof I affix my signature, in presence of two witnesses

CHARLES P. MAYS.

Witnesses:
F. L. BROWNE,
L. P. SQUIER.